3,419,721
OBJECT LOCATING BY MEANS OF SENSING
A LIGHT SPOT
Timothy Stephens, Burlington, Mass., assignor to the United States of America as represented by the Secretary of the Air Force
Filed Oct. 28, 1966, Ser. No. 590,260
7 Claims. (Cl. 250—202)

The present invention relates to an optical position sensing system, and more particularly to an optical system adaptable to determine the position of a model suspended magnetically in a wind tunnel.

The problem of supporting a model in a wind tunnel may be considered in two ways. First, there is the problem of positioning the model in the airstream in such a way that the aerodynamic interference between the model and its supports is a minimum. Second, the supporting system should be capable of transmitting the forces and moments that the model experiences to some sort of measuring apparatus.

Present experience indicates the practicality of magnetic suspension systems.

The object of the present invention is the provision of a system for tracking and position measurement of a model which may be magnetically suspended, or suspended in any other desired means.

A further object of the invention is the provision of an optical device comprising an apertured plate placed in the focal plane of a lens, and movable in that plane, wherein the movement of the apertured plate is governed by the signal received through the aperture by a photo detector, so that the position of the aperture is maintained at the edge of the image being tracked.

A still further object of the invention is the provision of means such as a chopper wheel interposed between a lens and a photo detector which performs the function of modulating the incident light periodically, thereby producing a periodically pulsating voltage output from the photo detector, and amplifying the extremely small amplitude of the photo detector to a usable level.

A still further object of this invention involves the provision of an optical position sensing system that utilizes conventional currently available materials that lend themselves to economical, mass production manufacturing techniques.

These and other advantages, features and objects of the invention will become more apparent from the following description taken in connection with the illustrative embodiments in the accompanying drawings, wherein.

Figure 1:
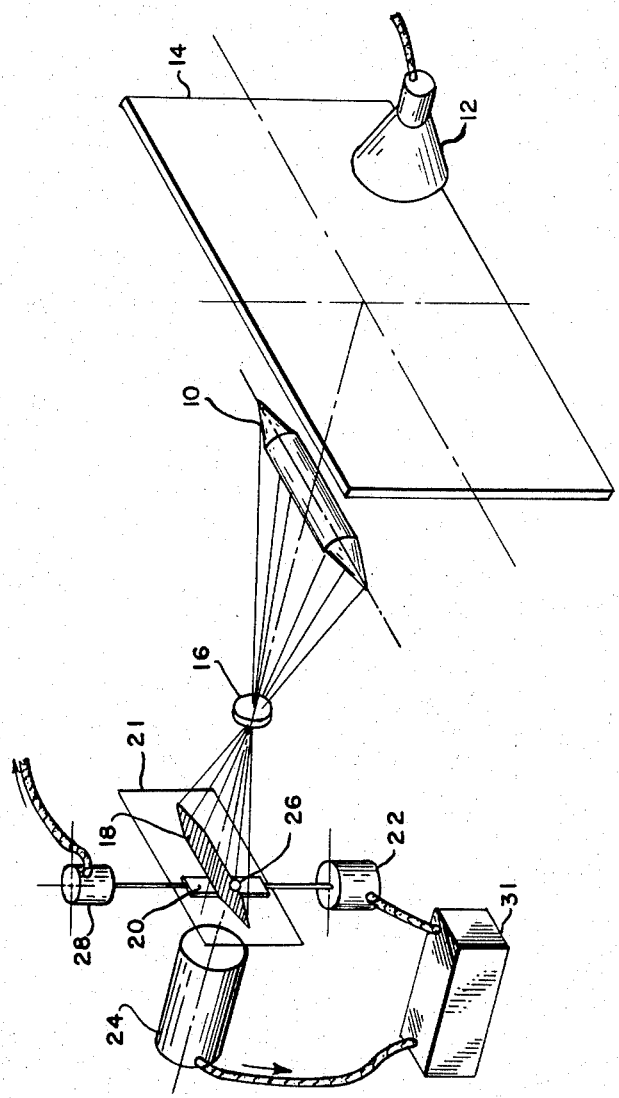
FIG. 1 is a schematic view showing elements of the position tracking system shown in perspective.
Figure 4:
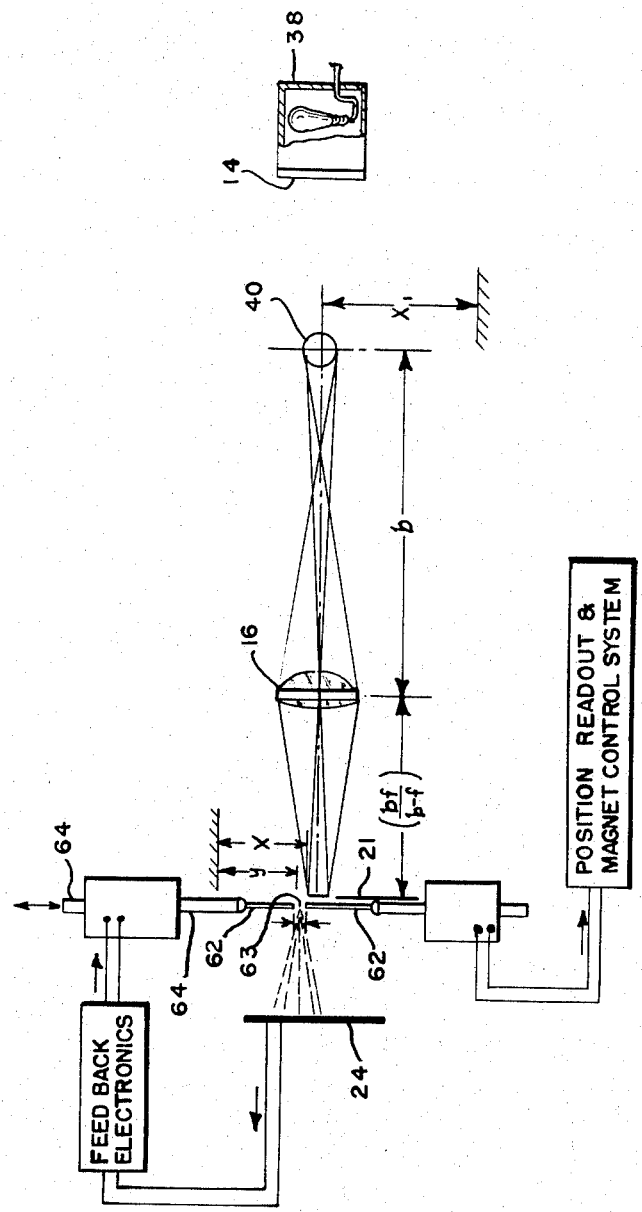
FIG. 4 is a schematic diagram of the elements of the invention showing quantitative relationships.

Referring more particularly to the drawing, a model, whose position is being tracked, is shown at 10. See FIGS. 1, 2 and 4.

The character of a light source 12 may be modified, as desired, by a translucent screen 14. A lens 16 placed on the opposite side of the model from the screen 14, collects and focuses the image 18 of the model on a plate 20 which lies in the focal plane of the lens 16. This plate 20 is mounted to move in one direction in the focal plane and is movable in response to a linear actuator 22. The position of the plate 20 is measured by a transducer device 28.

Behind the plates 20 lies a photo detector or photo multiplier 24 which receives the light passing through an aperture 26 in the plate 20. The light flux passing through the aperture depends on the position of the image 18 in relation to the aperture 26. The image 18 is equivalent to a sharply defined shadow. If the model 10 remains fixed in space, and the aperture 26 moves across the image 18, the photo detector 24 will produce an output signal that will clearly indicate the passage of the aperture 26 past the edge of the image 18. The output undergoes a transition from one level to another. The width of the transition region corresponds to the diameter of the aperture 26 for a sharply focused image 18. If the output of the photo detector 24 is held constant, in particular at the mean value of the maximum and minimum levels, then it is apparent that the aperture 26 maintains a constant distance from the edge of the image 18. Thus, the aperture 26 "tracks" the image 18. If the aperture 26 moves toward the image 18 from its mean position, the photo detector output will drop. Likewise, if it moves away from the image, the output will rise.

Thus, the output signal can be used to measure the relative position of the aperture 26 and image 18. More importantly, this output signal can be used to cause the aperture to closely follow the edge of the image 18 by amplifying the signal and applying it to the linear actuator 22 which moves the aperture plate 20.

The position of the aperture is measured by means of the position transducer 28. The signal that is read out relates to the position of the model 10 and is fed to an oscilloscope not shown and to a control system indicated at 30. The control system moves the plate 20 and aperture 26 with the same motion as the model 10 being tracked, but on a smaller scale. By means of a feedback system shown schematically at 30, the position of the aperture is controlled by the amplified photo detector signal. The position of the aperture 26 in relation to the image 18 controls the amount of light passing through the aperture. Thus, a feed back system is produced.

Thus the system will measure the position of a moving model.

Figure 2:
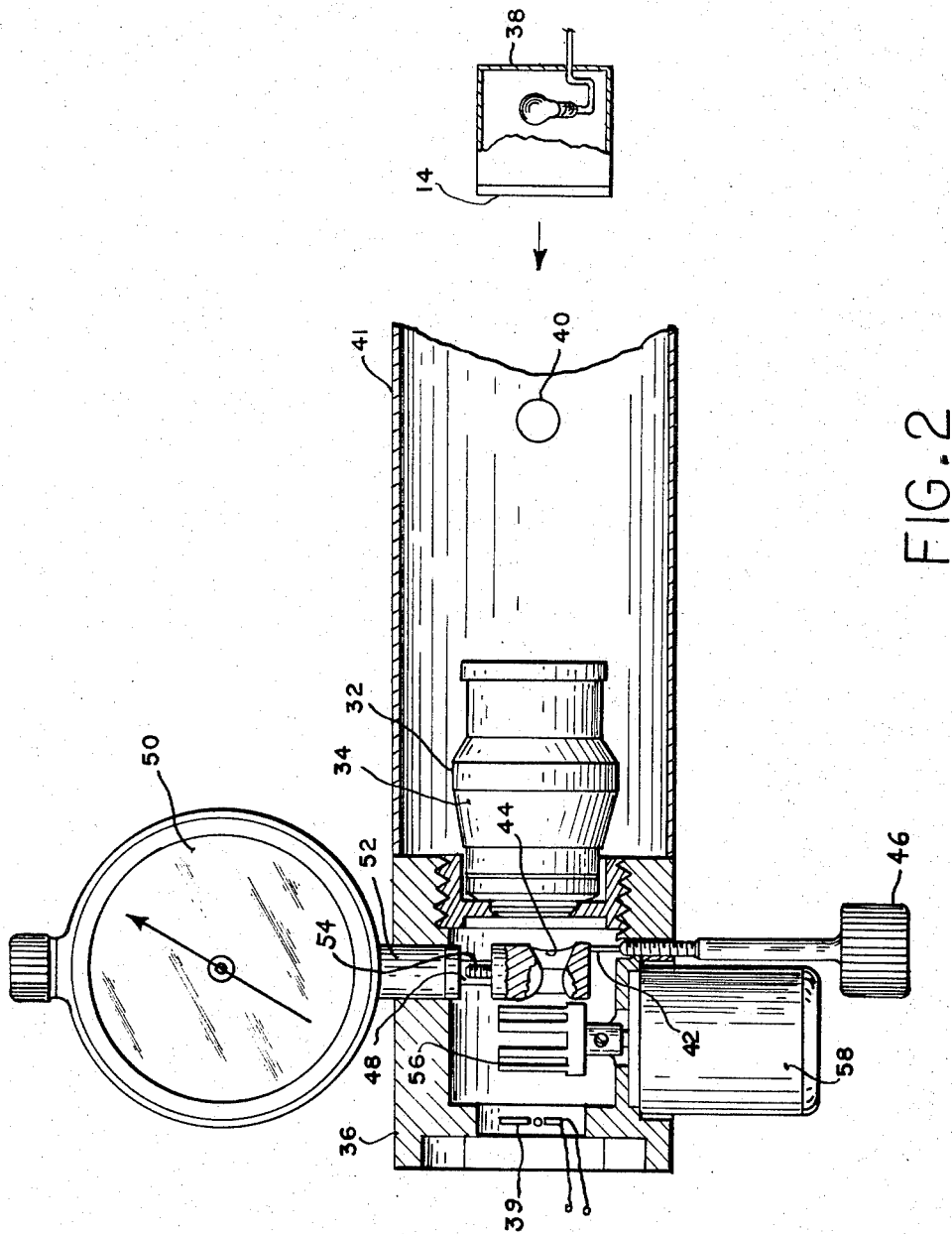
FIG. 2 is a cross sectional detail view of the photo detector portion of the device.

FIG. 2 is a cross sectional view of one modification of the device. The numeral 10 again represents a model suspended magnetically or by other means in a wind tunnel 31. A lens 32 is carried in a lens holder 34, suitably mounted in a casing 36. The lens 32 focuses light from the light source 38 to a photo detector 39 through an aperture 44 in a diaphragm 42. The diaphragm 42 is manually movable by any expedient means such as the thumb screw 46. The manual means may be replaced, as will later be seen, by automatic means governed by the photo detector signal.

The diaphragm 42 is attached to the plunger 48 of a dial indicator 50. The rigid barrel 52 of the indicator is mounted in the lens housing. The indicator plunger 48 is spring loaded, and may be equipped with a finely threaded adjusting screw 54.

Since the output voltage from the photo detector 24 is of extremely small amplitude, and is difficult to amplify with the usual D.C. coupled amplifier while maintaining a high signal to noise ratio at low frequency, the invention provides a means for causing pulsation of the voltage which can be amplified to a useful level. The means developed comprises a chopper wheel 56 propelled by a motor 58. The chopper wheel 56 consists of a cylinder mounted on an axis parallel to the axis of the indicator plunger 48 and is serrated to provide tongues positioned between the aperture 44 and the photo detector 24, FIG. 2. The chopper wheel serves the important function of modulating the incident light periodically, thereby producing a periodically pulsating amplifiable voltage output from the photo detector 24, FIG. 2.

The photo detector may be of any useful design, such as a silicon "solar cell" semiconductor device. The output voltage may be displayed on an oscilloscope (not shown), and is interpreted as a measure of the incident light. This device displays an ability to reliably measure the position of the model 10 to a high degree of accuracy.

Figure 3:
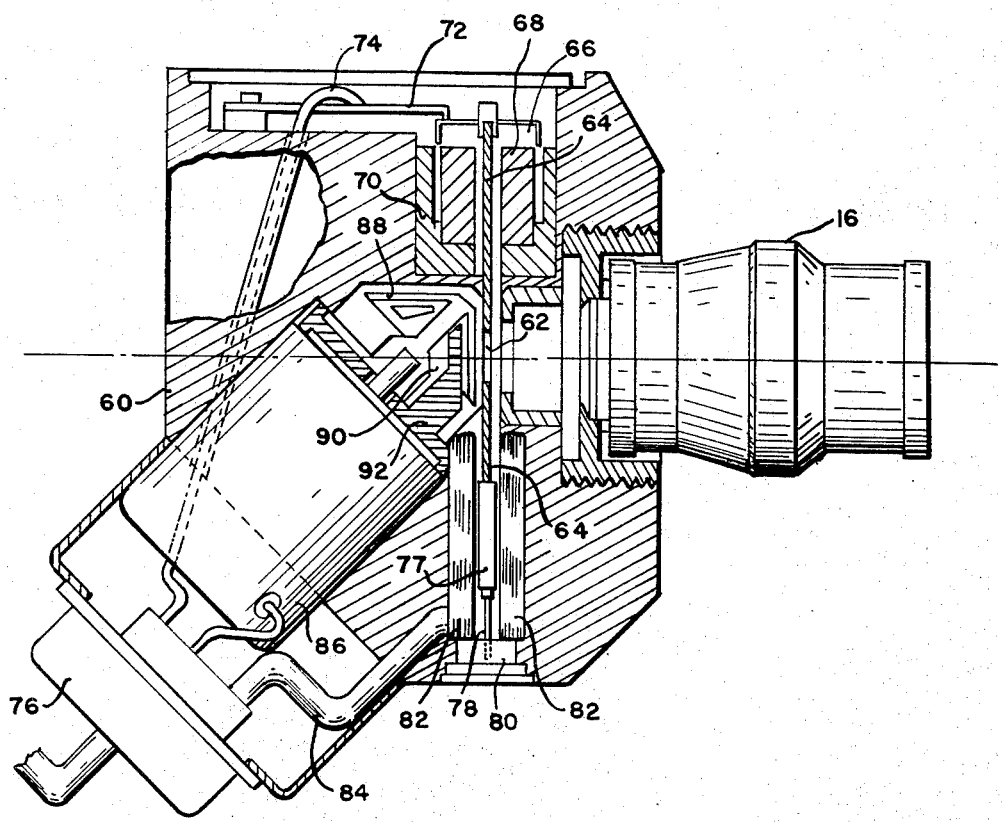
FIG. 3 is a cross sectional view of a modified form of the photo detector device.

A refinement of the device is shown in the modification of FIG. 3 wherein the tracking mechanism is self-regulating. The mechanism of the tracking system of FIG. 3 is housed in a suitable block 60 which may be of machined aluminum. An aperture plate 62 is attached to an armature 64. The upper end of the armature 64 is attached to a coil 66 which may be of a type similar to that found in a loud speaker. The coil moves in the radial magnetic field of a small cylindrical permanent magnet 68 which is placed in a tubular iron housing 70. This constitutes the actuator mechanism which moves the aperture plate 62. The armature 64 passes through the bore in the cylindrical magnet 68. The coil 66 is supported and centered by a cantilever leaf spring 72 which may be of beryllium-copper or other suitable material.

The coil leads 74 are attached to terminals close to the spring mount 72. Electrical connection is made to these terminals through the tracker housing 60 from the main electrical connector 76 located at the base of the housing 60. The lower end of the armature 64 is attached to a small cylindrical powdered-iron core 77 to which is attached a small needle-shaped plunger 78 which has a sliding fit in a plug 80 fitted in the base of the tracker body 60. The plug 80 centers the armature 64 and acts as a sliding bearing. It also holds a coil assembly 82 in place and surrounding the powdered-iron core 77. The coil and iron core assembly constitute a differential transformer, a device which is capable of accurately measuring the axial position of the iron core. The input and output leads 84 of the coil assembly lead to the main connector 76.

The axis of the chopper motor 86 is inclined at an angle of 45° to the armature axis to permit the use of a conical shaped chopper wheel 88. Equally spaced tapered slots 90 are machined in the inverted-funnel shaped wheel 88. Attached to the motor 86 is a mount 92 which holds a solar cell behind the conical surface of the wheel 88. The photocell leads are attached to the main connector 76, as are the motor leads. This geometry is compact and permits the photo cell and chopper wheel to be quite close to the aperture plate 62. The chopper motor 86 in this modification may be the same as that used in the manually operated device of FIG. 2.

The construction of some parts of this device required special techniques. Three parts worth mentioning are: the cylindrical permanent magnet 68, the voice coil 66, and the aperture plate 62.

The cylindrical permanent magnet 68 was made of a piece of Alnico V rod, ground to length and to diameter by conventional methods. A one-eighth inch diameter hole was required to be machined along the axis. Various methods were attempted with little success. However, an electro-erosion process called Flox was tried successfully, and was quite inexpensive.

The voice coil 66 was wound from No. 30 gauge nylon-insulated copper wire. It was wound in a double layer on an accurately machined Wood's metal arbor, and was painted with a nylon rod that was partly dissolved in a boiling phenol solution. When wound, the coil was washed in hot water to remove the remaining phenol, and the Wood's metal arbor removed by dipping in boiling water. Attempts to impregnate the coil using other methods were unsuccessful.

The aperture plate 62 consists of a thin sheet with a very small hole drilled in it. Best results were obtained by pricking with a needle a piece of 0.001 inch brass shim stock held against a piece of flat ground steel. Holes little more than 0.001 inch diameter could easily be produced in this way.

The feed back control system is produced as follows: The pulsating output of the photocell is suitably amplified and lead to the coil 66 and the aperture plate moves in response thereto. The position of the aperture of the plate 62 in relation to the image also controls the amount of light passing through the aperture. Thus, a feedback system is produced. The light flux is controlled by the difference between aperture and image positions and the aperture position is controlled by the light flux. The light flux through the aperture is thus equivalent to an error signal, indicating the tracking accuracy. The function of the feedback is to minimize this error signal. The minimum error signal comes about when the shadow edge falls in the center of the aperture. The output signal is produced by the position of the aperture with respect to a differential transformer.

Although the invention has been described with reference to particular embodiments, it will be understood by those skilled in the art that the invention is capable of a variety of alternative embodiments within the spirit and scope of the appended claims.

I claim:

1. An optical position sensing system comprising a light source, a lens positioned to receive light from said light source, a screen positioned in the focal plane of said lens to receive thereon an image of a model interposed between said lens and said light source and whose movements are to be measured, an apertured plate movable in one direction in the focal plane of said lens, a photo detector for receiving light through said aperture the amount of light received by said detector being determined by the position of the edge of said image with respect to the position of said aperture, means for moving said apertured plate and therefore the position of said aperture to follow the edge of said image, said means being actuated by the amount of light received by said photo detector.

2. In a device as claimed in claim 1, means attached to said movable plate for causing movements of said plate, said movements being a proportionate measure of the movement of said model.

3. In a device as claimed in claim 2, means also attached to said movable plate for recording movements of said plate, said movements being a proportionate measure of the movements of said model.

4. In a device as claimed in claim 1, means for rendering the impulse received by said photocell amplifiable, said means comprising a rotatable chopper wheel, tongues on said chopper wheel intermittently interrupting the light received by said photocell.

5. In a device as claimed in claim 3, a housing for said optical position sensing system, a motor for rotating said chopper wheel, said motor being placed in the base of said housing and at a 45° angle to the axis of said lens plate, said chopper wheel being mounted on the axis of said motor, the tongues of said chopper wheel being themselves disposed also at a 45° angle with respect to said plate, said photo electric cell being located closely behind the tongues of said chopper wheel and is close proximity to said plate.

6. A device according to claim 2 wherein the means for causing movements of said plate comprises an armature attached to said plate, a coil and magnet moving said armature and said plate in response to a signal received from said photo electric cell, said signal being a measure of the movements of said model image, and therefore a proportionate measure of the movements of said model.

7. A model image tracking system comprising a light source, a lens, said lens producing an image of a model whose movements are being tracked, a housing, a holder for said lens secured to said housing, a screen, normal to the axis of said lens for receiving said image, an apertured plate movable in the plane of said image, a photocell for receiving light modified by said image and also for receiving light through said aperture, a chopper wheel for rhythmically interrupting the light received by said photocell and rendering it amplifiable, said chopper wheel being conical in shape and the axis thereof being diagonally positioned with respect to the axis of said lens, a motor for said chopper wheel, the axis of said motor lying also in the same diagonal, means for moving said apertured plate in response to impulses received by said photocell, said means comprising an armature attached to said plate, a coil and magnet, said armature movable in response to impulses received by said coil from said photocell.

References Cited

UNITED STATES PATENTS

| | | | |
|---|---|---|---|
| 2,521,946 | 9/1950 | Rathje | 250—202 |
| 2,948,817 | 8/1960 | Carpenter | 250—237 X |
| 2,988,643 | 6/1961 | Inaba | 250—202 |
| 3,121,795 | 2/1964 | Marvin | 250—237 X |
| 3,382,366 | 5/1968 | Johnson | 250—202 |

JAMES W. LAWRENCE, *Primary Examiner.*

C. R. CAMPBELL, *Assistant Examiner.*

U.S. Cl. X.R.

250—237